3,233,053
SWITCH ACTUATOR RESPONSIVE TO DIRECTION OF SHAFT ROTATION
Robert Ray Parks, Ferndale, Mich., assignor to General Motors Corporation, Detroit, Mich., a corporation of Delaware
Filed Feb. 19, 1963, Ser. No. 259,550
1 Claim. (Cl. 200—61.39)

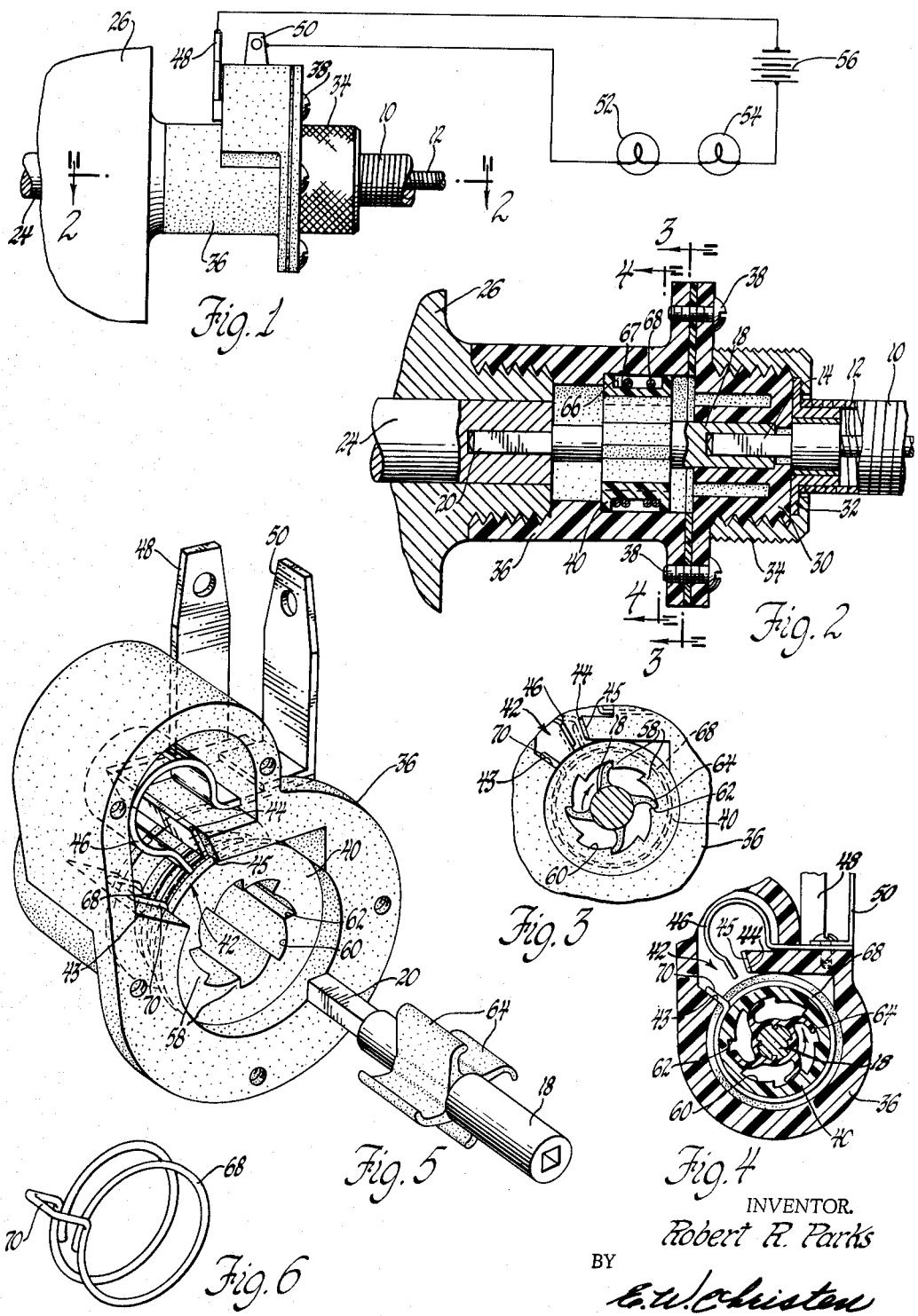
Feb. 1, 1966 — R. R. PARKS — 3,233,053
SWITCH ACTUATOR RESPONSIVE TO DIRECTION OF SHAFT ROTATION
Filed Feb. 19, 1963
INVENTOR.
Robert R. Parks
BY
E. W. Christen
ATTORNEY United States Patent Office 3,233,053
Patented Feb. 1, 1966

This invention relates to means for actuating a switch in accordance with rotation of a rotatable member in a given direction.

One form of the prior art for actuating an indicating device in accordance with the direction of rotation of a rotatable member utilizes an overrunning clutch interposed between the rotatable member and a driven member located coaxially of the rotatable member. A conductive strip is provided on a portion of the periphery of the driven member and is adapted to make contact with a pair of electrical brushes maintained in frictional engagement with the periphery of the member for a period of each revolution of the member as determined by the length of the conductive strip. The brushes are connected with a suitable indicating circuit to provide a flashing signal when the rotatable member rotates in one direction and no signal when the rotatable member rotates in the opposite direction since in the latter direction the rotatable member overruns with respect to the driven member. One problem with the device described is that it is operative only to provide a flashing signal indicative of the direction of rotation of the rotatable member and not a constant signal which in certain applications such as a vehicle back-up light circuit may be required.

In accordance with this invention, means are provided for actuating a switch for giving a constant signal in accordance with one direction of rotation of a rotatable member and for discontinuing the signal with rotation in the other direction. This is accomplished with an overrunning clutch interposed between the rotatable member and a driven member and a coil spring clutch interposed between the driven member and a switch. Upon rotation of the rotatable member in one direction a driving connection is obtained between the rotatable member and the driven member and between the driven member and the switch for closing the switch. When the switch is closed the spring clutch releases to permit the driven member to overrun with respect to the switch.

The invention may be better understood with reference to the accompanying drawing in which:

FIGURE 1 illustrates one application of the embodiment of the invention shown in FIGURE 2;

FIGURE 2 is a sectional view illustrating the invention and is taken along line 2—2 in FIGURE 1;

FIGURE 3 is a sectional view taken along line 3—3 in FIGURE 2;

FIGURE 4 is a sectional view taken along line 4—4 in FIGURE 2;

FIGURE 5 is an exploded perspective view of the invention; and

FIGURE 6 is a perspective view illustrating the coil spring clutch portion of the invention.

Referring to the drawing, there is shown a speedometer cable 10 having a flexible drive 12 rotatably mounted therein. The drive is provided at one end with driving shank 14 which is suitably connected with a shaft 18 so as to provide a driving connection therebetween. The other end of the shaft 18 is provided with a driving shank 20 suitably connected with a shaft 24 for purposes of driving a speedometer mechanism (not shown) within a speedometer housing 26. The shaft 18 is rotatably supported at one end within a housing 30 of non-conductive material. The speedometer cable 10 is prevented from disengagement axially of the shaft 18 by means of a shoulder 32 secured to the end of the cable 10 and an annular retainer member 34 which is screw fitted to the housing 30. The remaining portion of the shaft 18 not contained within the housing 30 is contained within a housing 36 of non-conductive material which is suitably screw fitted at one end to the speedometer housing 26 and bolted at the other end to the housing 30 with suitable means 38. The housing 36 has rotatably mounted therein a driven member in the form of a rigid cylindrical sleeve 40 coaxially surrounding the shaft 18 for purposes as will be explained hereinafter.

The housing 36, as best shown in FIGURE 5, is provided with a slot 42 defined by walls 43 and 45 extending radially of the shaft 18. A normally open electrical switch is provided including a stationary contact 44 and a movable spring biased contact 46. The stationary contact 44 is mounted on the wall 45 and the movable contact 46 has one end mounted to the housing 36 and the other end located within the slot 42 and normally biased out of engagement with the contact 44. The contacts 44 and 46 are respectively connected with spaced terminal posts 48 and 50 mounted on the housing 36. A vehicle back-up light circuit including a pair of lamps 52 and 54 connected together in series with a voltage source 56, which may take the form of the vehicle's battery, is connected across the terminal posts 48 and 50. Accordingly, when the movable contact 46 is displaced into and maintained in engagement with the stationary contact 44, the back-up light circuit is completed and the lamps 52 and 54 will be constantly energized.

In accordance with this invention, an overrunning clutch is interposed between the shaft 18 and the sleeve 40 for providing a driving connection therebetween when the direction of rotation of shaft 18 corresponds to reverse vehicle movement and for permitting overrun of the shaft 18 with respect to the sleeve 40 when the direction of rotation of the shaft 18 corresponds to forward vehicle movement. The clutch includes a plurality of ratchet teeth 58 formed on the inner surface of the sleeve 40. Each of the teeth 58 includes a cam surface 60 extending inwardly of the sleeve and an abutment surface 62 extending in a radial direction between the innermost and outermost points of adjacent cam surfaces. The shaft 18 is provided with four resilient pawl members 64 extending radially outward of the shaft 18 and disposed in quadrature about the circumference of the shaft. The free ends of the pawl members 64 are curved as indicated by FIGURES 3, 4 and 5 to lightly engage the ratchet teeth 58 of the sleeve 40. In operation, if the shaft 18 rotates in a counterclockwise direction, as illustrated in FIGURE 4, the free ends of the pawl members 64 will slip over the cam surfaces 60 thereby permitting overrunning of the shaft 18 with respect to the sleeve 40. However, if the shaft 18 rotates in a clockwise direction, as illustrated in FIGURE 3, the free ends of the pawl members 64 will engage the abutment surfaces 62 of the ratchet teeth 58 to provide a driving connection between the shaft 18 and the sleeve 40.

Furthermore, in accordance with this invention, a coil spring clutch is interposed between the sleeve 40 and the movable contact 46. The outer surface of the sleeve 40 defines an annular channel 66 terminating in a rigid cylindrical surface 67. A coil spring 68, taking the form as best shown in FIGURE 6, coaxially surrounds the sleeve 40 and is located within the channel 66 and normally maintained in compressive frictional engagement with the cylindrical surface 67 of the sleeve 40 for rotation therewith in either direction. The spring 68 includes a tab 70 at one end extending radially outward as shown in FIGURE 6. The clutch is assembled so that the tab 70 is located within the slot 42 between the wall 43 of the housing 36 and the movable contact 46.

In operation, upon rotation of the shaft 18 in a counterclockwise direction, as depicted in FIGURE 4, corresponding with forward vehicle movement, friction between the pawls 64 and sleeve 40 and between the coil spring 68 and sleeve 40 causes the spring and sleeve to rotate with the shaft until the tab 70 engages the wall 43 of the housing 36. The wall 43 acts as a stop surface to cause the coil 68 to wind up and tightly grip the sleeve 40 to stop its rotation whereby the shaft 18 overruns with respect to it. Upon clockwise direction of the shaft 18, as depicted in FIGURE 3, corresponding with reverse vehicle movement, the sleeve 40 is clutched for rotation by the pawls 64 while the spring 68 is carried by frictional engagement with the sleeve until the tab 70 engages the movable contact 46 to displace it into engagement with the stationary contact 44 to complete the back-up light circuit. Tab engagement in this direction unwinds the spring 68 to release the sleeve 40 so it can run with the shaft. By varying the distance between walls 43 and 45 of the housing 36, completion of the back-up light circuit can be made to depend on the degree of reverse vehicle movement.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claim.

I claim:

A switching device comprising in combination:

a body;

a shaft mounted in said body and adapted to rotate reversibly;

a switch mounted on said body and operated in one direction of rotation of said shaft;

a member adapted to be rotatable with said shaft;

a one-way clutch connecting said member to said shaft so that said member is driven positively in said one direction of rotation of said shaft, said one-way clutch being adapted to produce appreciable drag in the other direction of rotation of said shaft;

a friction clutch driven by said member having two clutch elements with limited mutual friction in said one direction of rotation and having increased mutual friction in said other direction of rotation, which increased friction is greater than the drag of said one-way clutch, said friction clutch being connected to said member and said switch to operate said switch in said one direction of rotation;

and stop means formed in said body and engaged by said friction clutch in said other direction of rotation so that said friction clutch resists the rotation of said member with said shaft.

References Cited by the Examiner

UNITED STATES PATENTS

| | | | |
|---|---|---|---|
| 2,132,188 | 10/1938 | Rockett | 200—61.39 X |
| 2,751,773 | 6/1956 | Woodson | 192—12 |
| 2,920,156 | 1/1960 | Rice | 200—61.39 |

KATHLEEN H. CLAFFY, *Primary Examiner.*

BERNARD A. GILHEANY, *Examiner.*